Patented July 16, 1940

2,208,519

UNITED STATES PATENT OFFICE 2,208,519

PREPARATION OF FUMARIC ACID

Le Roy U. Spence, Elkins Park, and John C. Mitchell, Philadelphia, Pa., assignors to Röhm & Haas Company, Philadelphia, Pa.

No Drawing. Application November 25, 1938, Serial No. 242,288

3 Claims. (Cl. 260—537)

This invention relates to a process for converting maleic acid to fumaric acid. It relates particularly to a process whereby high yields of fumaric acid can be obtained in a relatively short time.

It is well known that heating maleic acid either alone or in an aqueous solution converts it to fumaric acid. It is also known that certain acids, such as hydrochloric, hydriodic, nitric, etc., act as catalysts for this transformation. It is further known that potassium thiocyanate, when present in small amounts, will increase the conversion of maleic acid to fumaric acid.

The process of the present invention is essentially an improvement in the method of carrying out the conversion in the presence of thiocyanates. Terry and Eichelberger, Jour. Am. Chem. Soc. 47, 1402 (1925), heated an 8% aqueous solution of maleic acid containing 0.5% of potassium thiocyanate in a sealed tube for 8⅔ hours at 99.2° C. and obtained a 68% conversion to fumaric acid. Such a process could not be economically used on a commercial basis principally on account of the large proportion of water, the long time required, and the relatively poor yield.

It has now been found that, by suitably regulating the initial concentration of the maleic acid and the amount of potassium thiocyanate, yields of 85 to 90% can be obtained in a short time and without the necessity of working under pressure in a closed system. Such yields can be obtained by heating an aqueous solution of maleic acid containing between about 40 and about 75% of the acid, preferably 60–65%, and from about 1.0 to 3.0% of potassium thiocyanate or the equivalent amount of another soluble thiocyanate such as of sodium, ammonium, calcium, barium, etc. The most convenient temperature is the boiling point of the solution which, according to the concentration, can vary from somewhat over 100 to 115 or 120° C. Lower temperatures may also be used but, if the conversion is carried out below about 70° C., it is too slow to be of commercial value.

The process is carried out as follows:

A solution of maleic acid is prepared either from the acid itself or from its anhydride, containing between 50 and 75% of maleic acid. To this there is added from 1 to 3% of a soluble thiocyanate such as sodium, potassium or ammonium thiocyanate and the resulting solution is heated at about 100° C. for about two hours. If desired, the solution may be boiled. If so, the boiling point is initially about 115-120° C. but it falls gradually as the fumaric acid which forms is precipitated. Maleic acid is very soluble in water whereas fumaric acid is much less so. Hence the fumaric acid begins to precipitate as soon as its solubility is reached. At 100° C. a saturated solution of fumaric acid contains about 8.8% acid and at 25° C. about 0.6% whereas at 100° C. a saturated solution of maleic acid contains 84% acid and at 25° C. about 45%. After heating the solution for the desired time it is cooled to about room temperature whereupon it becomes practically a solid mass. This mass is mixed with some cold water, filtered and washed once or twice with cold water. Most of the water is drained off and the remaining crystals dried in any convenient manner. The fumaric acid thus obtained is very pure, usually better than 95%. Recrystallization of the fumaric acid is not necessary unless an extremely pure product is desired.

The yield of fumaric acid depends on the initial concentration of the maleic acid, the concentration of the thiocyanate employed and the time of heating. The yield increases as the initial concentration increases up to about a 75% solution, beyond which it begins to drop off. Thus, insofar as the effect of the concentration is concerned, there is a range between about 50 and about 75% within which the yield of fumaric acid is at a maximum. This effect may be seen from the data in Table I. In this and in the following tables the time is expressed in hours, concentration of maleic acid and of potassium thiocyanate in terms of the entire solution and the yield in terms of the maleic acid employed.

Table I

| Time | Maleic acid | KSCN | Yield |
|---|---|---|---|
| | Percent | Percent | Percent |
| 2 | 20 | 1.38 | 69.7 |
| 2 | 53 | 1.37 | 87.4 |
| 2 | 63 | 1.38 | 87.4 |
| 2 | 85 | 1.38 | 62.5 |

The yield also depends on the concentration of the thiocyanate. Generally speaking, about 1.0 to 1.5% calculated on the total solution is sufficient, but smaller and greater amounts can be employed. If much less than about 1.0% is used, the conversion is too slow for practical purposes and the increased yield obtained by using more than about 1.5% is not very great. This effect is found irrespective of the initial concentration of the maleic acid. The data in Table II show the results obtained by varying the amount of thiocyanate at various concentrations of maleic acid.

*Table II*

| Time | Maleic acid | KSCN | Yield |
|---|---|---|---|
|  | Percent | Percent | Percent |
| 2 | 28 | 0.24 | 34.0 |
| 2 | 28 | 0.72 | 65.0 |
| 2 | 53 | 0.46 | 64.1 |
| 2 | 53 | 1.37 | 87.4 |
| 2 | 63 | 1.00 | 83.5 |
| 2 | 63 | 1.08 | 86.2 |
| 2 | 63 | 1.38 | 87.4 |
| 2 | 62 | 2.14 | 90.8 |
| 2 | 62 | 2.70 | 91.0 |
| 2 | 77 | 0.68 | 50.5 |
| 2 | 76 | 1.57 | 86.2 |
| 4 | 53 | 0.46 | 67.6 |
| 4 | 63 | 1.37 | 89.0 |
| 6 | 54 | 0.23 | 43.5 |
| 6 | 53 | 0.46 | 73.2 |
| 6 | 53 | 1.37 | 90.5 |

The conversion of maleic acid to fumaric acid takes place rapidly at about 100° C. in the presence of a soluble thiocyanate, particularly when the initial concentration of the maleic acid and the thiocyanate are properly chosen. The conversion usually progresses far enough for commercial purposes in about two hours. In this time about 85% of the maleic acid initially present has been converted; by prolonging the time the yields may be increased to about 90%. This effect is observed irrespective of the concentration of the maleic acid or the thiocyanate as the data in the following table show.

*Table III*

| Time | Maleic acid | KSCN | Yield |
|---|---|---|---|
|  | Percent | Percent | Percent |
| 2.0 | 53 | 0.46 | 53.3 |
| 4.0 | 53 | 0.46 | 67.6 |
| 6.0 | 53 | 0.46 | 73.2 |
| 0.67 | 53 | 1.37 | 76.7 |
| 2.0 | 53 | 1.37 | 87.8 |
| 4.0 | 53 | 1.37 | 89.0 |
| 6.0 | 53 | 1.37 | 90.5 |
| 0.25 | 76 | 1.57 | 66.7 |
| 2.0 | 76 | 1.57 | 86.2 |

As indicated above, the best temperature range for carrying out the conversion is from about 70 to about 120° C., preferably between 100 and 120°. At lower temperatures the conversion is slower. A solution containing 62.5% of maleic acid and 1.38% of potassium thiocyanate was heated at 75–85° C. for two hours and yielded 78.3% of fumaric acid. The same solution heated for two hours at 45–55° C. yielded only 33.3%. Prolonged heating at the lower temperatures would probably increase the yield but it would not be so high as the yield obtained on short heating at the higher temperatures.

The data in the foregoing tables were obtained from experiments in which potassium thiocyanate was used. Other soluble thiocyanates are equally effective, particularly sodium and ammonium thiocyanates. The following table shows results obtained with sodium and ammonium thiocyanates.

*Table IV*

|  | Time | Maleic acid | Thiocyanate | Yield |
|---|---|---|---|---|
|  |  | Percent | Percent | Percent |
| NH$_4$SCN | 2.0 | 63 | 1.38 | 89.8 |
| NH$_4$SCN | 4.0 | 53 | 1.38 | 88.9 |
| NaSCN | 2.0 | 61 | 1.02 | 92.5 |
| None | 7.0 | 54 | 0.00 | 6.8 |

The overall conversion of maleic acid to fumaric acid according to the present invention may be increased somewhat by using the filtrate and washings from one batch in preparing the solution for the following batch. In such cases the amount of maleic acid in the filtrate and washings is determined and sufficient maleic acid or maleic anhydride added to bring the concentration of the maleic acid within the desired range. The thiocyanate is then added in the proper amount. Since the thiocyanate is decomposed during the conversion, it is necessary to add the full amount of fresh thiocyanate to the succeeding batches. It is not recommended to use the filtrate and washings more than twice in this way because the decomposition of the thiocyanate gives rise to colored compounds which remain in the fumaric acid and affect its purity.

We claim:

1. The process of converting maleic acid to fumaric acid which comprises heating an aqueous solution containing from about 40 to about 75% of maleic acid and from about 1 to about 3% of a soluble thiocyanate to a temperature of from about 70 to about 120° C. for a period of time between about 15 minutes and about six hours.

2. The process of converting maleic acid to fumaric acid which comprises heating an aqueous solution containing from about 60 to about 65% of maleic acid and from about 1 to about 1.5% of a member of the group consisting of the alkaline earth thiocyanates, the alkali metal thiocyanates, and ammonium thiocyanate to a temperature of about 70 to about 120° C. for a period of time between about 15 minutes and about six hours.

3. The process of converting maleic acid to fumaric acid which comprises heating an aqueous solution containing from about 60 to about 65% of maleic acid and from about 1 to about 1.5% of potassium thiocyanate to the boiling point of the solution for a period of time between about 15 minutes and about six hours.

LE ROY U. SPENCE.
JOHN C. MITCHELL.